United States Patent [19]

Suh

[11] Patent Number: 4,697,171
[45] Date of Patent: Sep. 29, 1987

[54] ELECTRONIC LOCK AND KEY

[75] Inventor: Kyung S. Suh, Seoul, Rep. of Korea

[73] Assignee: Dsung Precision Company, Seoul, Rep. of Korea

[21] Appl. No.: 823,103

[22] Filed: Jan. 27, 1986

[30] Foreign Application Priority Data

Mar. 25, 1985 [KR] Rep. of Korea .................. 85-1940

[51] Int. Cl.[4] ............... E05B 45/06; B60R 25/04
[52] U.S. Cl. ............................ 340/543; 340/64;
340/542; 340/573; 340/576; 180/173; 180/272;
180/287; 361/171; 307/10 AT
[58] Field of Search ............... 340/64, 542, 543, 576,
340/825.31, 825.32, 825.34, 573; 180/173, 272,
287; 361/171, 172; 307/10 AT; 128/724

[56] References Cited

U.S. PATENT DOCUMENTS

| 4,189,712 | 2/1980 | Lemelson | 340/542 |
|---|---|---|---|
| 4,366,466 | 12/1982 | Lutz | 340/64 |
| 4,438,426 | 3/1984 | Adkins | 340/543 |
| 4,471,343 | 9/1984 | Lemelson | 340/64 |

Primary Examiner—Donnie L. Crosland
Attorney, Agent, or Firm—Blakely, Sokoloff, Taylor & Zafman

[57] ABSTRACT

An electronic lock and key includes an electronic key which produces a specific electric signal such as a frequency signal, photo signal or logic signal when inserted into the key holder of the lock; and an electronic lock which is comprised of a power source, a key holder, a lock signal generator, and a signal comparing circuit that compares the signal of said key and the signal of said lock signal generator. The electronic lock and key further includes: a delay/switching circuit which supplies a power source to an unlocking device when the key is recognized as a proper key, an unlocking device which is controlled by a delay/switching circuit and which is actuated by the power ource, and alarming circuit which is actuated when a key is recognized as a wrong key and when an excessive power voltage is applied, and a protecting circuit which operates to protect as the electronic lock and key circuitry from short circuits and excessive power voltages, when used with a vehicle, an alcohol sensing part, can be added to the starting system of a vehicle for preventing a driver from driving while intoxicated. A start/switching part is also provided between the signal comparing circuit and the starting system for controlling the start of the engine of the vehicle in accordance with the authenticity of the key and the operation of the alcohol sensing part.

12 Claims, 27 Drawing Figures

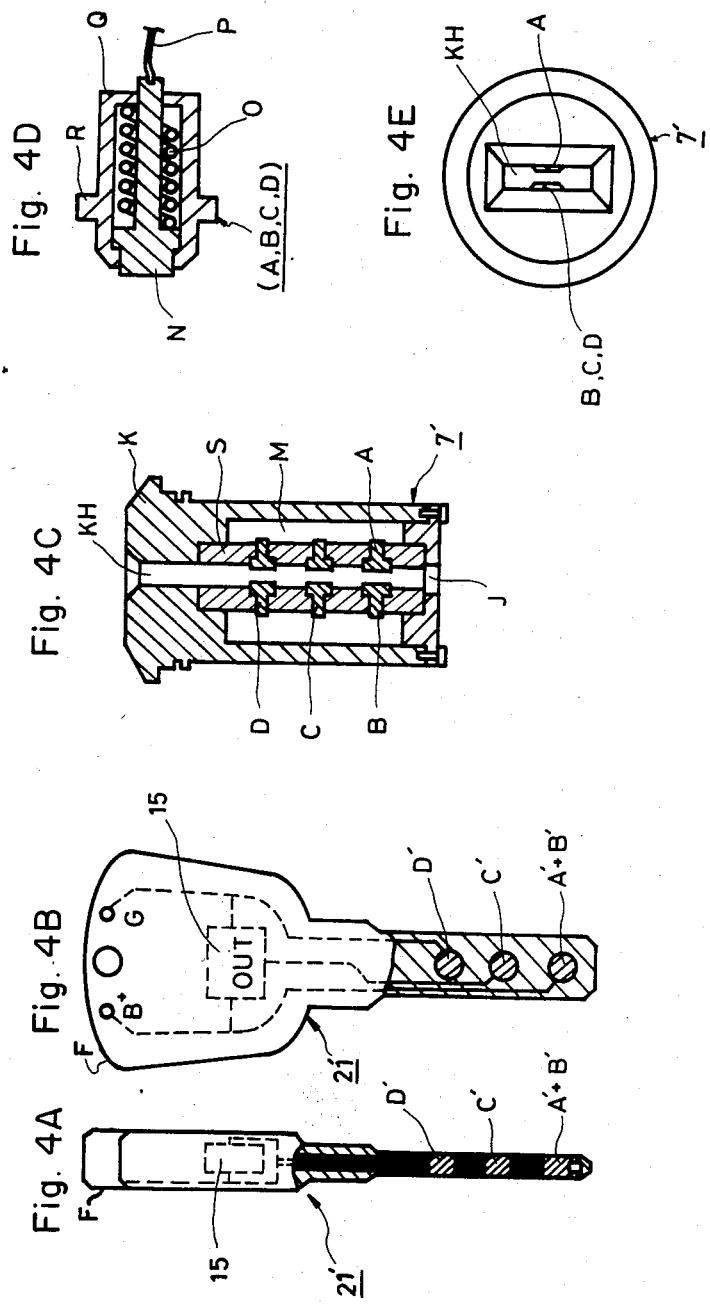

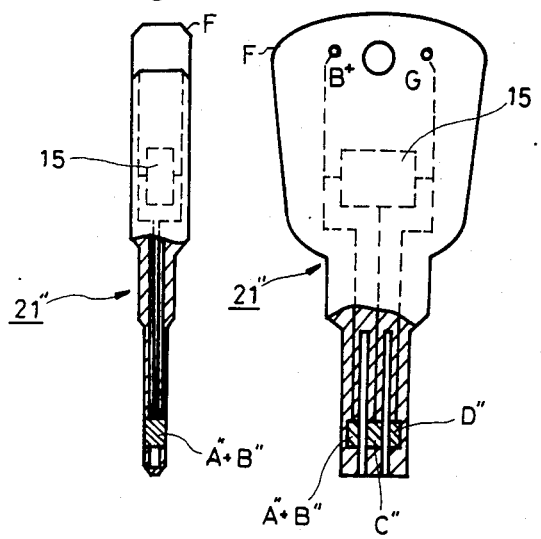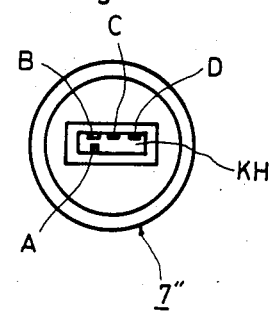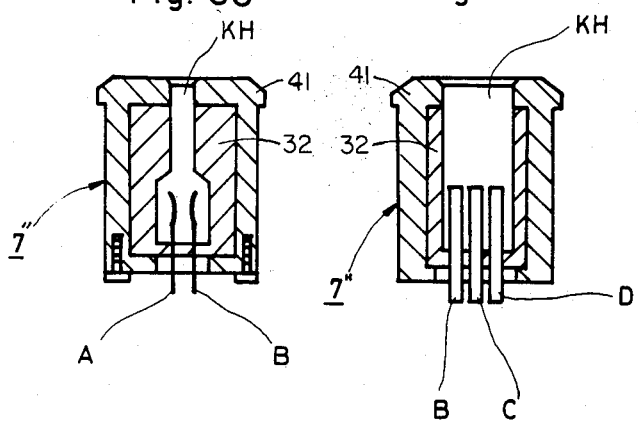

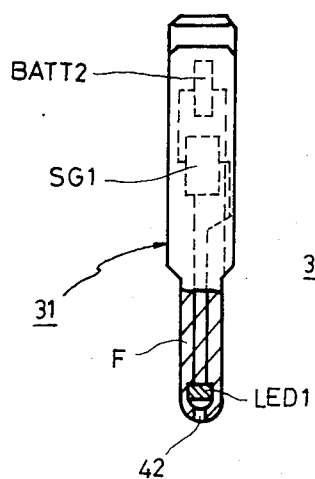
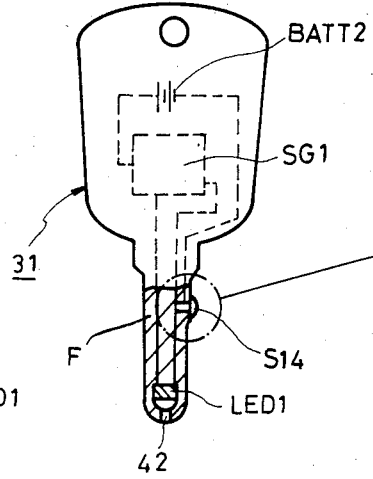
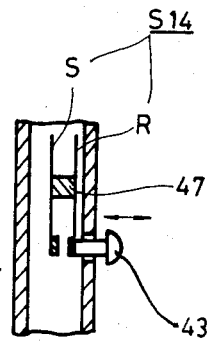
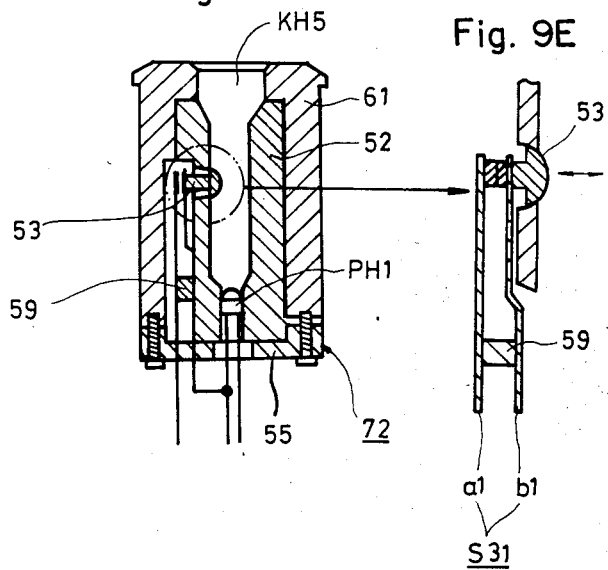
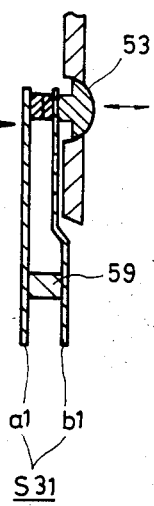
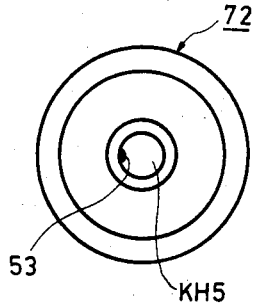

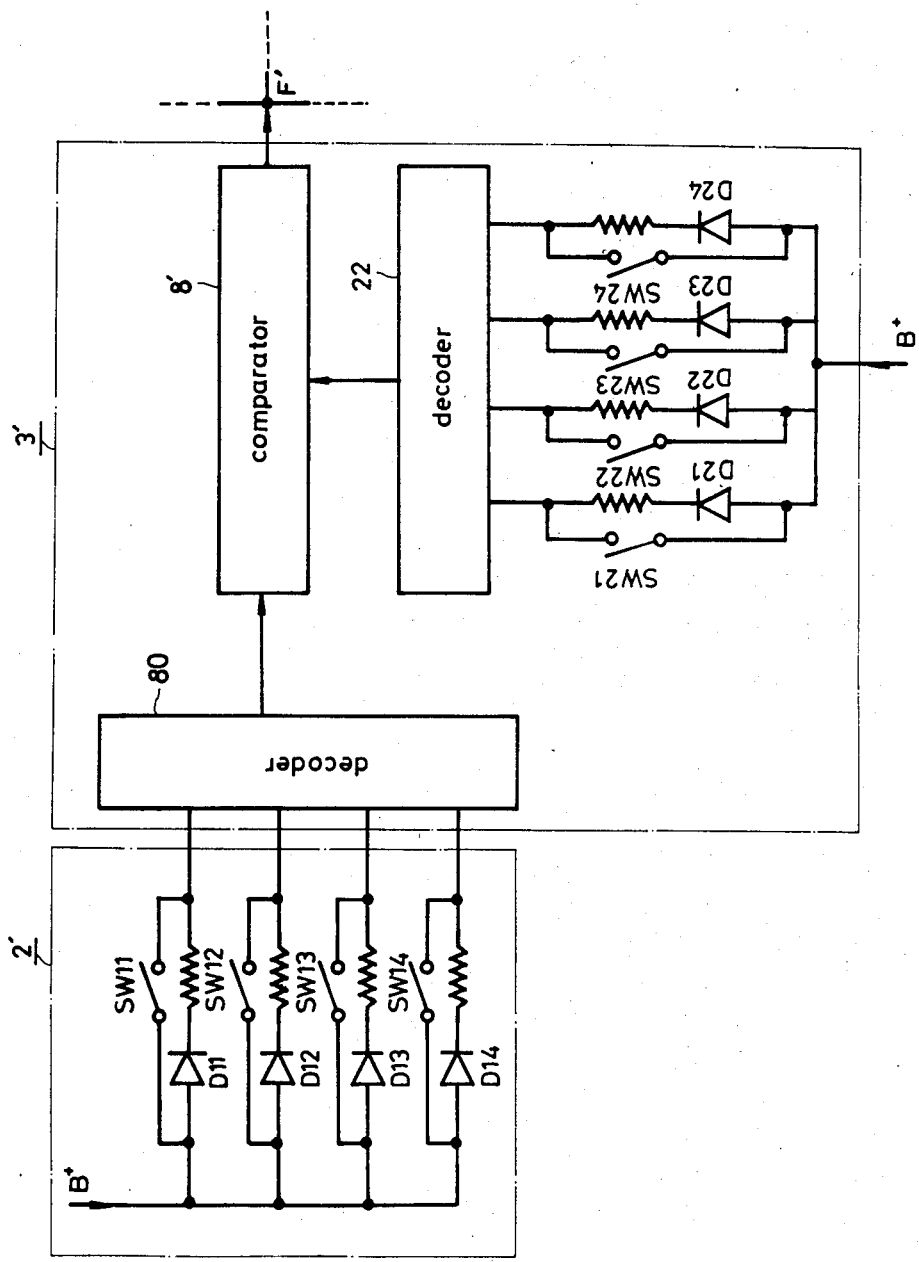

ELECTRONIC LOCK AND KEY

BACKGROUND OF THE INVENTION

The present invention relates to an electronic lock and key, and more particularly to an electronic lock and key in which the lock is unlocked when an electric signal generated by the key coincides with an electric signal generated by the lock.

Prior art locks are of the mechanical magnetic, and electronic type. However the mechanical and magnetic type prior art locks do not provide sufficient security because they can be easily unlocked by resemblant keys.

The prior art electronic type locks typically have a memory device in which a specific code number is stored. The user inputs a predetermined code number by pushing buttons or other input means provided on the device. When the code value inputed coincides with the number stored in memory, the apparatus unlocks. Although the electronic type lock provides greater security than the mechanical or magnetic type locks, it also has serious disadvantages. For example, the particular code number used to unlock the device can be visually observed by others or otherwise disclosed thereby permitting unauthorized unlocking. Also, the input code number can be lost, stolen or forgotten. For these reasons the prior art electronic type lock, similar to the prior art mechanical and magnetic type locks, does not provide desirable security

SUMMARY OF THE INVENTION

The present invention overcomes the obstacles and drawbacks found in the prior art by providing a new and improved electronic lock and key in which the lock is unlocked by a specific predetermined frequency signal, logic signal or photoelectric signal which emanates from the key. Also, when the lock and key of the present invention is employed with automobiles or other vehicles, an alcohol sensing component may be added near the starting system of the vehicle in order to prevent a driver from driving while he is intoxicated.

Accordingly, the present invention provides an electronic lock and key comprising an electronic key which produces a specific predetermined electric-signal when inserted into a key hole of the electronic lock. The electronic lock includes a signal comparing circuit which compares the signal outputted by the key with a predetermined reference signal produced by the lock, and which outputs a low level signal when the signal produced by the key corresponds to the reference signal and a high level signal when the reference and key signals do not correspond. The present invention also includes a delay/switching circuit which allows a power source to unlock the lock after delaying the output signal from the signal comparing circuit, and further includes an alarming circuit which is actuated when the two signals produced by the lock and key do not correspond or when an excessive power voltage is provided to circuits of the lock. The lock and key of the present invention also includes a protecting circuit that protects the lock circuitry against excessive power voltages applied thereto and against short circuits therein.

BRIEF DESCRIPTION OF THE DRAWINGS

FIGS. 4A-4E illustrates a first construction of the first embodiment of the electronic key, key holder and key hole of the present invention.

FIGS. 5A-5E illustrates a second structure of the first embodiment of the electronic key, key hole and key holder of the present invention.

FIGS. 9A-9F illustrate structures of the third embodiment of the electronic key, key holder and key hole of the present invention.

FIG. 11 illustrates a third embodiment of the present invention.

DETAILED DESCRIPTION OF THE INVENTION

The present invention will be described in detail with reference to preferred embodiments in conjunction with the accompanying drawings.

Figure 1:
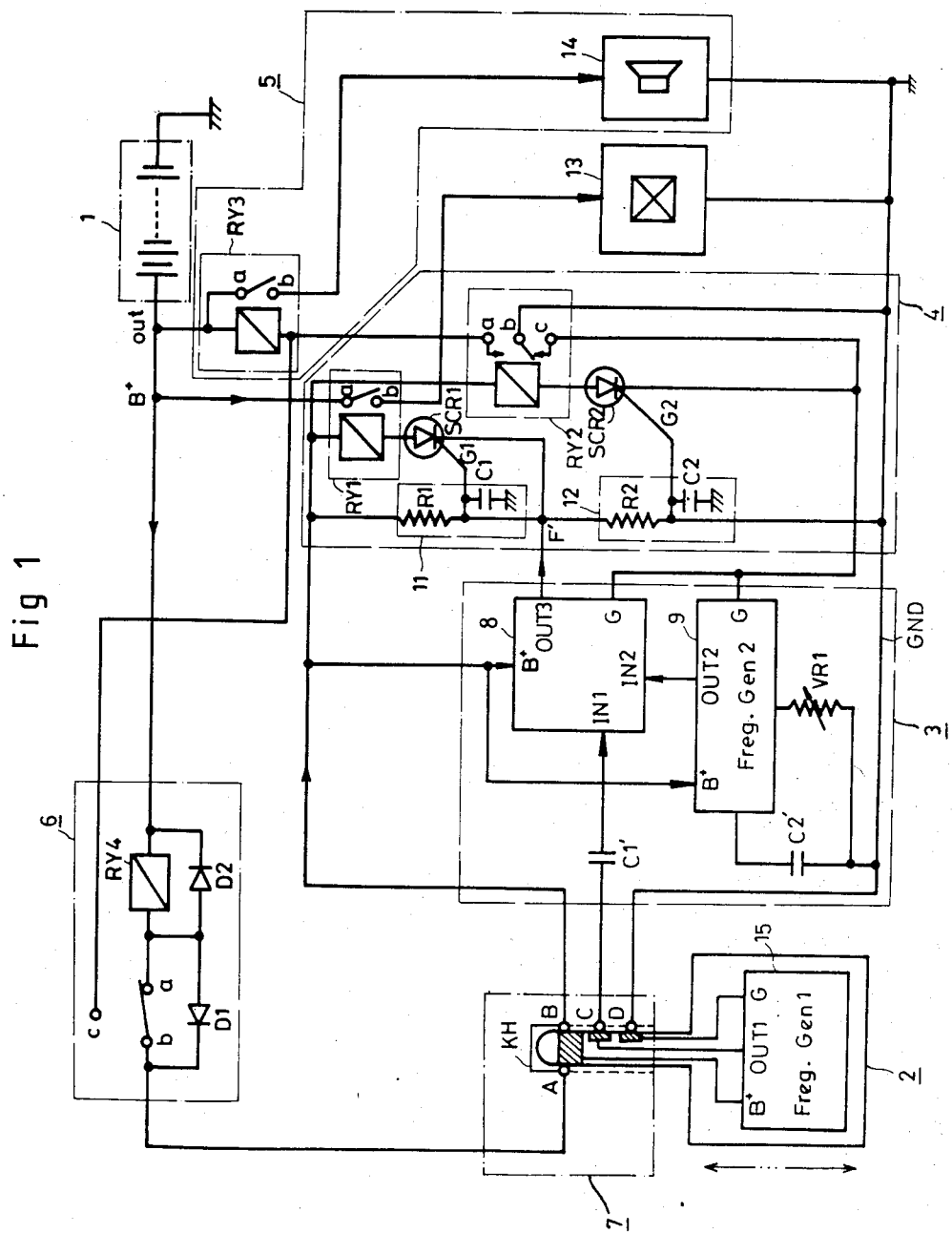
FIG. 1 illustrates a circuit diagram of the present invention.

FIG. 1 shows basic circuit diagram of the present invention. In FIG. 1, reference numeral 1 denotes a D.C. power source such as a battery; 2 denotes an electronic key which includes a key signal generator 15; 3 denotes a signal comparing circuit which includes a lock signal generator 9 and a compartor 8; 4 denotes a delay/switching circuit which includes a first delay circuit 11, a second delay circuit 12, a first silcon controlled rectifier SCR1, a first relay circuit RY1, a second silicon controlled rectifier SCR2 and a second relay circuit RY2. Reference numeral 5 denotes an alarming circuit which includes a relay circuit RY3 and an alarm 14, 6 denotes a protecting circuit which is for protecting the circuits from excessive voltages; 7 denotes a key holder which is disposed in the lock; 13, denotes an unlocking device of the solenoid type which operates when actuated by the electric power source 1.

The D.C. power source 1, the key holder 7, the signal comparing circuit 3, the delay/switching circuit 4, the alarming circuit 5, the protecting circuit 6 and the unlocking device 13 collectively comprise the lock of the present invention.

The operation of the circuits shown in FIG. 1 is as follows.

The electronic key 2 includes a key signal generator 15, which produces a predetermined particular electric signal such as a frequency signal when the power source 1 is supplied thereto. In the manufacturing of the present invention, the frequency signal of the key 2 is preset to a specific frequency that coincides with the frequency of the reference signal generated by the lock signal generator 9.

The electronic key 2 is inserted and extracted through the key hole KH of the key holder 7. In the key holder 7, contacts A-D are formed on the inner surface of the key hole KH.

When the electronic key 2 is inserted into the key hole KH, B+ of power source 1 is supplied to the key signal generator 15 through the contacts a and b of the relay circuit RY4 and contact A of the keyhole KH, while B+ of power source 1 is also supplied to the signal comparing circuit 3 and delay/switching circuit 4 through the contact B of the keyhole KH (in FIG. 1 the slash lined-portion of the key 2 denotes the conductive portion of same).

The key signal generator 15 of the key 2 produces a predetermined signal when coupled to B+ of power source 1 and transmits same via contact C to the input terminal IN1 of the comparator 8 through the coupling capacitor C1.

The signal comparing circuit 3 includes the comparator 8 and lock signal generator 9 as mentioned above. After insertion of the key into the key hole KH, B+ of power source 1 is supplied thereto and the ground potential GND is provided by the actuation of the relay circuit RY2 which opens contacts a and b thereof (the contacts b and c of the relay circuit RY2 are connected in the normal state i.e. when the key is not inserted). The lock signal generator 9 then generates and outputs a specific reference frequency signal to the comparator 8.

The comparator 8 operates as a frequency comparator, it compares the frequency signal from the key 2 with the reference signal from the signal generator 9. When the frequency signal from the key signal generator 15 corresponds with the reference signal from the lock signal generator 9 (i.e. when the proper key 2 is inserted), the comparator 8 outputs a low level signal at the output terminal OUT 3. Conversely, if the two frequency signals do not correspond, the comparator 8 outputs a high level signal.

When the output of the comparator 8 is low level, the point F' also becomes low level, hence B+ of power source 1 charges the capacitor C1 of the first delay circuit 11 through the resistor R1. When the capacitor C1 becomes fully charged the SCR1 is actuated and the relay circuit RY1 operates. Thereafter B+ of power source 1 is supplied to the unlocking device 13 through the contacts a, b of the relay circuit RY1. Thus the unlocking device 13, actuates to unlock the lock when B+ of power source 1 is supplied thereto.

The unlocking device 13 in the described embodiment is of the solenoid type, however, it is not limited to the solenoid type but can be any electrical device which similarly operates when actuated by an electric power.

On the other hand, if the output of the comparator 8 is high level (i.e. when the wrong key is inserted), the point F' also becomes high level, hence the first delay circuit 11 cannot be charged while the second delay circuit 12 is charged by the high level signal.

When the capacitor C2 of the second delay circuit 12 becomes fully charged, the SCR 2 is actuated, and the relay circuit RY2 also actuates. Consequently, the contact b of the relay circuit RY2 comes into electrical connection with the contact a thereof, and the ground potential GND is provided to the relay circuit RY3. Therefore, the relay circuit RY3 actuates and B+ of power source 1 is supplied to the alarm 14 through the contacts a and b of the relay circuit RY3. The alarm 14 is then actuated, thereby informing and alerting anyone listening of the insertion of an improper key. In conjunction with the above, the signal comparing circuit 3 loses the ground potential GND because of the actuation of the relay circuit RY2, so that the signal comparing circuit 3 does not carry out further comparing operation.

When the wrong key is pulled out from the keyhole KH, B+ power source 1 is no longer supplied to the relay circuit RY2, and the contact b thereof returns to the contact c of relay circuit RY2 so that the relay circuit RY3 is disconnected from the ground potential GND thereby deactuating RY3 which, in turn, terminates the operation of the alarm 14.

The following is a discussion of the significance and purpose of the two delay circuits 11 and 12.

Although the proper key 2, which generates the same frequency signal as the signal of the lock, may be inserted in the keyhole KH, a noise signal momentarily appears at the inital insertion of the key 2. Such noise can cause the comparator 8 to produce a high level signal which would, in turn, sound the alarm 14. The two delay circuits 11 and 12 are for preventing faulty operation caused by such a high level noise signal, wherein the capacitance of the capacitor C2 is larger than the capacitance of the capacitor C1 so that SCR2 is not actuated before SCR1, and the momentary noise signal cannot cause the SCR2 and RY2 to actuate the alarm 14.

After the momentary noise disappears, the comparator 8 outputs a low level signal and the SCR1 is actuated and the unlocking operation occurs.

The operation of the protecting circuit 6 for protecting the other circuitry of the present invention from excessive voltages and short circuits is as follows.

In normal condition, the impedance of the rear circuits of the key holder 7 is large, so that a relatively small current flows through the relay circuit RY4, and thus relay circuit RY4 is not actuated (the contact b of the relay circuit RY4 is connected to the contact a when the key is not in the inserted position within the key hole KH.)

When a short circuit occurs in the system shown in FIG. 1, the contact b of the relay circuit RY4 reaches the ground potential GND, and a large current flows through the relay circuit RY4 which actuates relay circuit RY4 to bring the contact b of RY4 into connection with contact c of RY4. When this occurs, B+ of power source 1 is not supplied to circuits 7,2, 3 and 4, so that the circuits 7, 2, 3 and 4 are protected from the short circuit. In conjunction with the actuation RY4, the ground potential GND is provided to the relay circuit RY3 thereby actuating RY3 which, in turn, supplies B+ power source 1 to the alarm 14, thereby actuating alarm 14 to sound an alarm which draws attention to the short circuit.

When an excessive power source is supplied to the system shown in FIG. 1, the relay circuit RY4 also becomes actuated by the excessive current, and the alarm 14 operates through the above mentioned process.

In the above mentioned description, the two signals generated by the key and lock were frequency signals, however, these frequency signals can be replaced with a logic signal or a photo-electric signal as will later be discussed.

Figure 2:
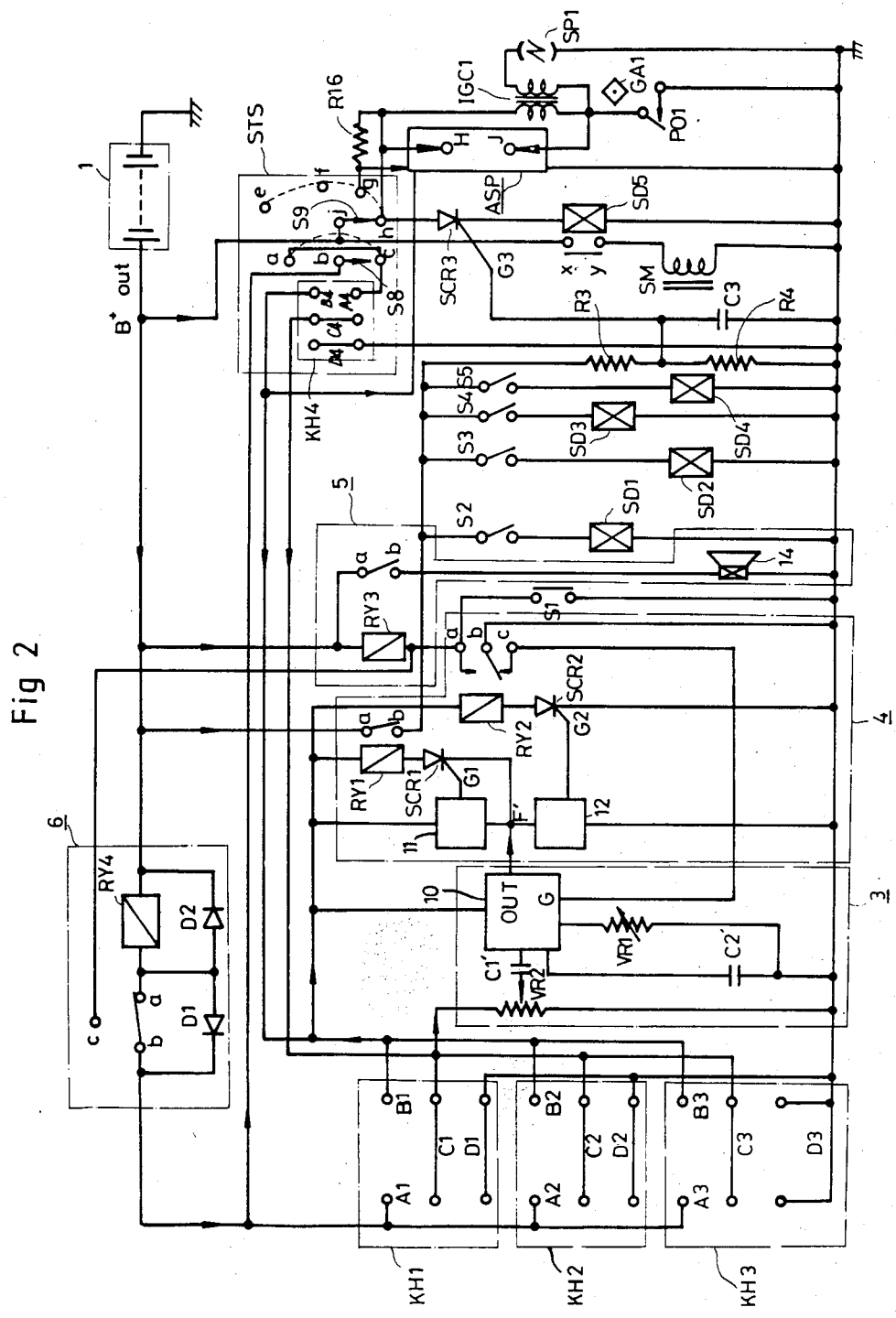
FIG. 2 illustrates a circuit of a second embodiment of the present invention for use in a vehicle.

Further, the present invention can be applied to an ordinary cash box, door, file cabinet or vehicle. FIG. 2 shows a diagram of an embodiment of the present invention for use with vehicles.

In FIG. 2, the key holes KH1-KH3 are formed on the door, bonnet and trunk of a vehicle respectively. The contacts C1-C4 in each one of the key holes are common - connected, and are also connected to the generator/comparator circuit 10 which is comprised of the comparator 8 and the lock signal generator 9 shown in FIG. 1. The variable resistor VR2 is for setting the input level to the generator/comparator circuit 10.

The start/switching component STS of FIG. 2 is comprised of the key hole KH4, a conventional start switch S9 and a control switch S8, which rotate and are mounted near the driver's seat for controlling the start of the engine. The same key, (which is inserted in any of the key holes KH1–KH3), is used to initiate operation of the start/switching part STS. Reference symbol S1 denotes an alarm switch while S2 and S3 denotes switches for the door lock solenoids SD1 and SD2, S4 and S5 represent switches for the solenoids SD3 and SD4 of the bonnet and trunk respectively. The switches S2–S5 are mounted in the outer door knobs of a vehicle. SM denotes a start motor of a vehicle, IGC1 denotes the ignition coil of a vehicle, PO1 denotes a contact point of a vehicle, GA1 denotes a rotor of a vehicle and SP1 denotes a spark plug of a vehicle. The operation of the circuitry of FIG. 2 will later be discussed more fully.

Figure 3:
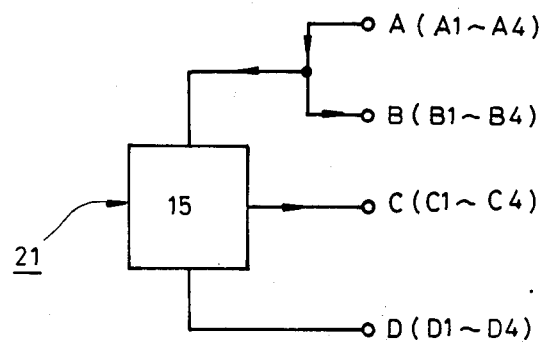
FIG. 3 illustrates a functional block diagram of the electronic key of the present invention.

FIG. 3 shows a diagram of the first embodiment of the key 21 will be a direct signal generating type, reference numeral 15 denotes the key signal (frequency signal) generator as illustrated with FIG. 1. Contacts A–D corresponds to the contacts A1–A4, B1–B4, C1–C4 and D1–D4 shown in FIG. 2.

The mechanical structures of the key 2 and key holder 7 can be a vertical type or a horizontal type.

FIG. 4 shows the structures of the vertical type key 21' and key holder 7'; where wherein FIG. 4 (A) shows a partially cutaway—side view of the key 21'. FIGS. 4(B) shows a partially cutaway—front view of the key 21'. As is apparent from FIGS. 4(A) and 4(B), the contacts A'–D'are vertically arranged. The key frequency signal generator 15 (also illustrated in FIG. 1) is disposed on the key 21'. The references symbol F denotes an insulator made of synthetic resin. The contacts A'–D' are brought into contact with the contacts A–D shown in FIG. 1 or with the contacts A1–A4, B1–B4, C1–C4 and D1–D4 shown in FIG. 2, depending on which circuit is employed with the key 21'.

FIG. 4(C) is a cross sectional view of the key holder 7' which is an example of the key holder 7 also shown in FIG. 1, the key holder 7' is comprised of the metallic member K, an insulator S and contacts A–D. The contacts A–D correspond to the contacts A1–A3, B1–B3, C1–C3 and D1–D3 shown in FIG. 2. There is also a space M which is to prevent the contacts A–D from contacting with the metallic member K. Reference symbol J denotes the hole for electric wires which are connected to the contacts A–D.

A detailed illustration of the structure of each contact A–D is shown in FIG. 4 (D). Each contact (A–D) is comprised of a metallic head N, a spring 0 and housing a Q which has the protuberance R. The protuberance R serves the purpose of fixing the contact to the insulator S. Because of the tension applied by the spring 0, the head N will pressed against the contacts A'–D' of the key 21'. Reference symbol P denotes an electric wire which is inserted through the hole J shown in FIG. 4(C) to the related circuits shown in FIG. 1.

FIG. 4(E) shows a planar view of the key holder 7', having a key hole KH.

The direct signal generating type key can also be a horizontal type key 21" as shown in FIG. 5.

As is apparent in FIG. 5(A) and (B), the contacts A"–D" of the key 21" are arranged horizontally, and the key holder 7" has the form shown in FIG. 5(C) and (D).

FIG. 5(C) shows a cross sectional side view of the key holder 7", FIG. 5(D) shows a cross sectional front view of same. The key holder 7" is comprised of the housing 41, insulator 32 and contacts A–D. The contacts A–D correspond to the contacts A1–A3, B1–B3, C1–C3 and D1–D3 shown in FIG. 2.

FIG. 5 (E) shows a planar view of the key holder 7", having a key hole KH.

FIG. 6 shows structures of the start/switching part STS illustrated in FIG. 2.

Figure 6A:
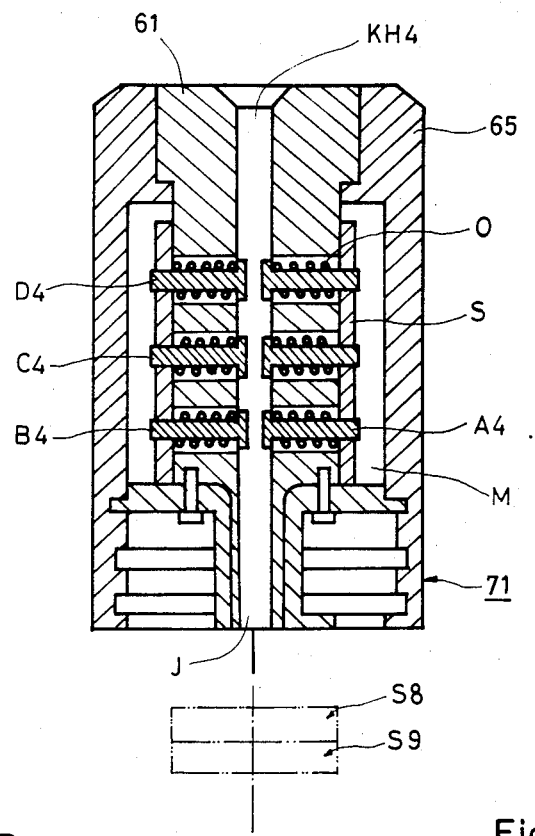
FIGS. 6A-6D illustrates the key hole and key holder of the present invention employed for starting the engine of a vehicle.
Figure 6B:
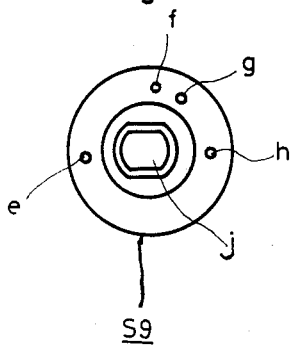
Figure 6C:
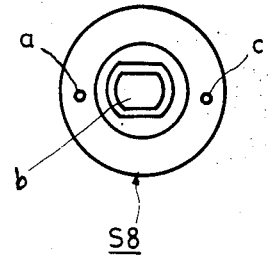
Figure 6D:
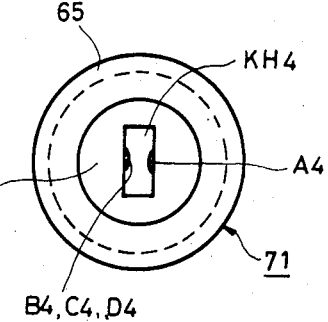

FIG. 6(A) shows a cross sectional view of the key holder 71 which is similar to that of FIG. 4(C), however the start switch S9 and control switch S8 are mounted within the key holder 71 coaxially. In FIG. 6, reference numeral 61 denotes a rotating shaft, M denotes a space, 65 denotes a housing, 0 denotes a spring and S denotes an insulator. The contacts A4–D4 are brought into electrical connection with the contacts A'–B40 or A'-'–B" of the key, and rotate while maintaining their state of contact. According to the rotation of the key and contacts A4–D4, switches S8 and S9 also rotate so that the contacting state of the contacts a–j shown in FIG. 2 and FIG. 6(B) (C) is changed as the key rotates. FIG. 6(B) shows a planar view of the conventional start switch S9, FIG. 6(C) shows a planar view of the control switch S8. FIG. 6(D) shows a planar view of the key holder 71.

The direct signal generating type key 21', 21" and key holder 7', 7", and 71, can also be a photo-electric type.

Figure 7:
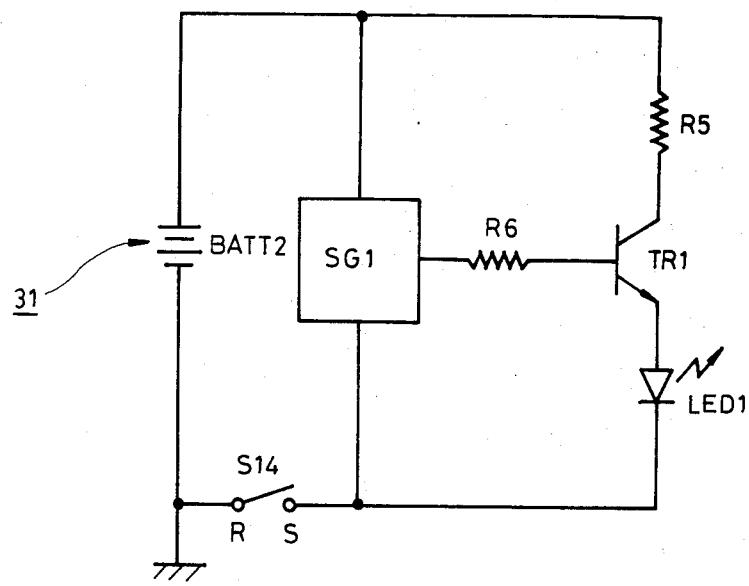
FIG. 7 illustrates a circuit diagram of a second embodiment of the electronic key of the present invention.

FIG. 7 shows a diagram of the photo-electric type key 31 comprised of the signal generator SG1, resistor R5 and R6, transistor TR1, light emitting diode LED1, switch S14, and batter BATT2. The switch S14 is closed when the key 31 is inserted in the key hole.

Figure 8:
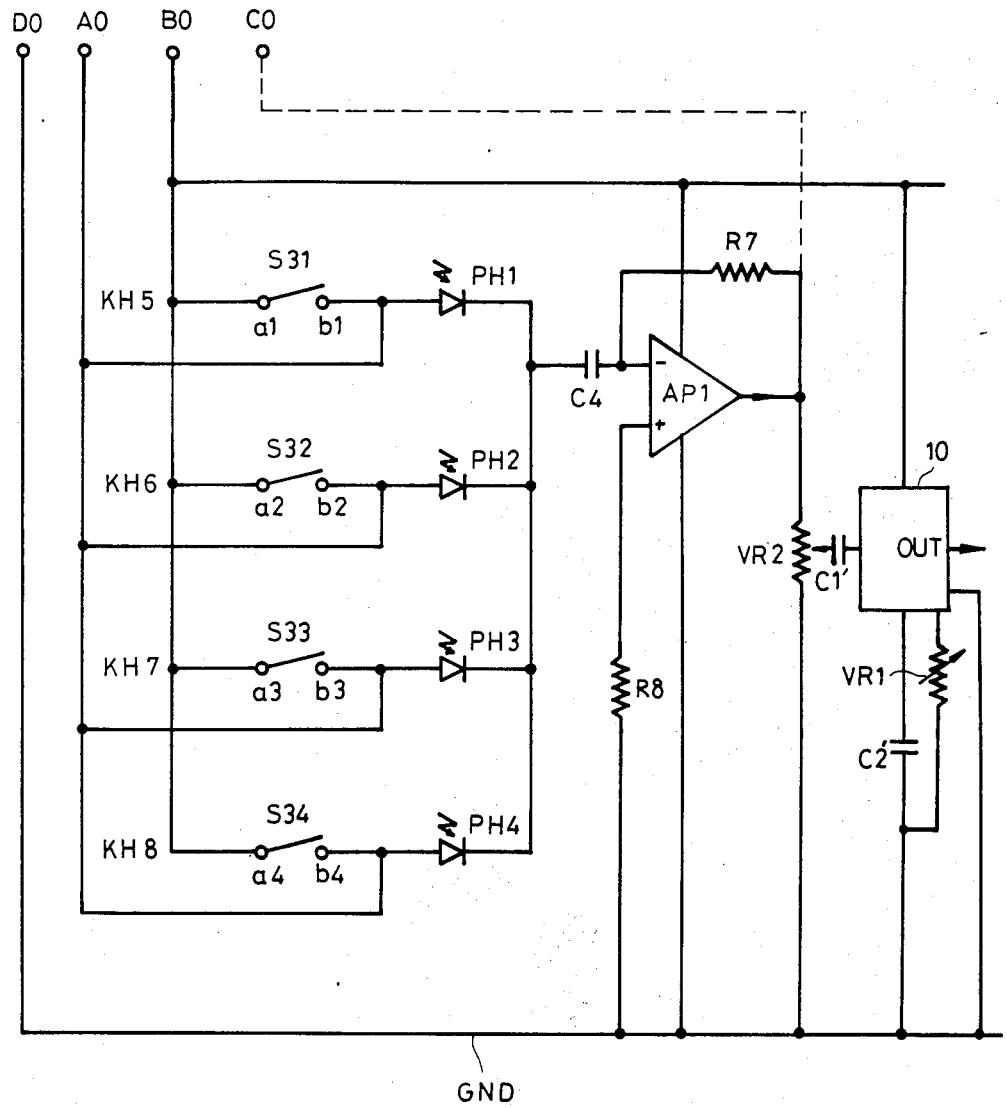
FIG. 8 illustrates a diagram of the photo electric receiving circuit of the second embodiment of the present invention.

FIG. 8 shows a diagram of the photo-electric receiving circuit of the present invention which corresponds to the photo type key 31 shown in FIG. 7. In the photo-electric receiving part, key holes KH5–KH8 correspond to the key holes KH1–KH4 shown in FIG. 2. When the photo-electric type key 31 is inserted into the key holes KH5, KH6, KH7 or KH8, the corresponding switches S31, S32, S33 or S34 close respectively, therefore the light from the light emitting diode LED1 (shown in FIG. 7) is received by the photo receiving elements PH1, PH2, PH3, or PH4. The received photo electric signal is then amplified and regulated by the amplifier AP1, and is then applied to the generator/comparator circuit 10 which, in turn, carries out the afore described comparison to determine if the key inserted is a proper key. Reference symbols A0–D0 denote contacts, and correspond to the contacts A–D shown in FIG. 1.

The structures of the photo type key 31 and photo receiving part illustrated in FIG. 7 and FIG. 8 are shown in FIG. 9.

FIG. 9(A) shows a partially cutaway—side view of the photo type key 31, FIG. 9(B) shows a partially cutaway—front view of the key 31, FIG. 9(C) shows a detailed view of the circled parts of the key shown in FIG. 9(B).

As is apparent from drawings of FIGS. 9(A)–(C), the key 31 is comprised of the signal generator SG1, insulator F, light emitting diode LED1, depressing member 43, switch S14, insulator 47 and battery BATT2. In the key 31, there is a hole 42 for allowing the output of the photo signal from the LED1 to be received a photo receiving element PH1 disposed on the lower part of the key holder 72. When the key 31 is inserted in the key hole KH5, KH6, KH7 or KH8, the depressing member 32 becomes depressed so that the switch S14 is closed and the LED1 turns on or off according to the signal from the signal generator SG1.

The key holder 72 which is one component of the photo receiving part is shown in FIGS. 9(D), 9(E) and 9(F). Reference numeral 53 denotes a depressing member of the key holder 72 which, becomes depressed thereby closing the switch S31 when the key 31 is inserted through the key hole KH5. The depressing member 53 is shown in FIG. 9 (E) in detail. The photo converted—signal received by the photo receiving element PH1 is applied to the amplifier AP1 shown in FIG. 8.

In FIG. 9(D) and FIG. 9 (E), reference numeral 52 and 59 denote insulators, 61 denotes a housing while a1 and b1 denote contacts of the switch S31 shown in FIG. 8.

FIG. 9(F) shows a planar view of the key holder 72, having a key hole KH5. The key holder 72 may also be used for the key holes KH6–KH8 of FIG. 8.

The following will describe the alcohol sensing part ASP of the present invention which is included in the embodiment shown in FIG. 2.

Figure 10:
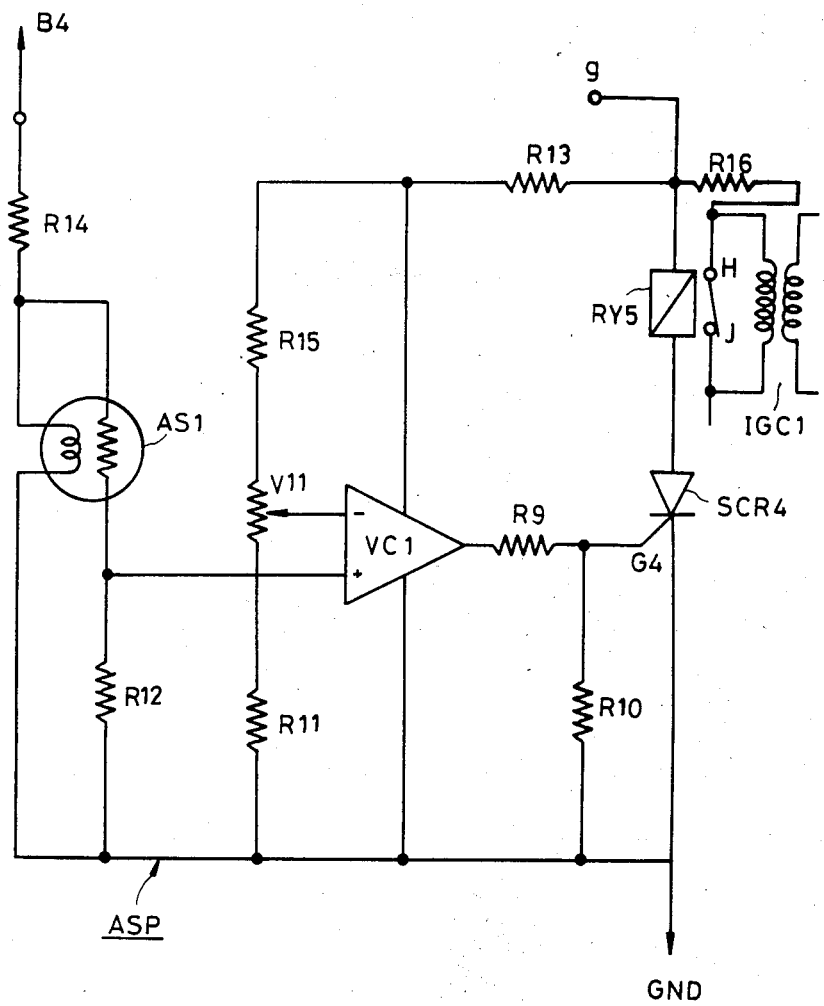
FIG. 10 illustrates a diagram of the alcohol sensing component and start controlling component of the present invention.

FIG. 10 shows a diagram of the alcohol sensing part APS. A voltage converted signal is outputted from the alcohol sensor AS1 in response to the sensing by same of alcohol. AS1, is connected to the non inverting terminal of the voltage comparator VC1. The output of the voltage comparator VC1 is applied to the gate G4 of the SCR4. If the output is high level (i.e. if the degree of alcohol sensed exceeds a predetermined value), the SCR4 is actuated which in turn actuates the relay circuit RY5 thereby closing contacts H and J which, in turn, short circuit the ignition coil IGC1.

The alcohol sensor AS1 is mounted near the driver's seat. In FIG. 10, the variable resistor V11 is used for adjusting and setting the sensing point.

The operation of the embodiment shown in FIG. 2 will be described in detail with reference to FIG. 4, FIG. 6 and FIG. 10.

In following description, the vertical type key 21' and key holder 7' shown in FIG. 4 will be used as an example, however, the horizontal type key 21" shown in FIG. 5 and the photo-electric type key 31 shown in FIG. 9 may also be used.

The doors of the vehicle are opened by using the key 21' and switches S2 and S3.

The switch S2 is mounted on the door knob of the right door, switch S3 is mounted on the door knob of the left door.

When a driver inserts the key 21' into the key hole KH1, the relay circuit RY1 becomes actuated and the driver can then open right door if he depresses the switch S2. The left door may be opened when the switch S3 is depressed.

The bonnet or trunk may be opened by inserting the key 21" into the holes KH2 or KH3 and depressing the switches S4 or S5 respectively.

The unlocking operation occurs in the same fashion as previously explained with reference to FIG. 1.

After the driver enters the vehicle, he inserts the key 21' into the key hole KH4, thereafter he rotates the key 21' from the contact e ("off" position) to the contact h ("start" position) of the start switch S9. At that time, the contact b of the control switch S8 is brought into contact with the contact c. Therefore, B+ of power source 1 is supplied to the key signal generator 15 and other circuits 3 and 4. The signal generator 15 in the key 21' then produces a specific frequency signal, and the output frequency signal is applied to the generator/comparator circuit 10 through the contact C4.

When the signal from the key 21' coincides with the signal of the lock, the SCR1 is turned on, and B+ of power source 1 is supplied to another delay circuit comprising resistors R3, R4 and capacitor C3. When the capacitor C3 becomes fully charged, SCR3 is actuated and B+ power source 1 is supplied to the start solenoid SD5 through the contacts j and h of the start switch S9. Therefore, the solenoid SD5 becomes actuated and the contacts x and y are thereby closed, which in turn initiates operation of the start motor SM.

After the engine is started, the contact j of the start switch S9 comes into electrical connection with the contact g, as wellknown in the art, (i.e. key 21' is rotated to the "running" position). The contact b of the control switch S8 is also disconnected from the contact c, therefore B+ power source 1 is no longer supplied to the contact A4 of the key hole KH4. However, this does not affect the running of the vehicle because the engine, at that point, has already been started, and B+ of the power source 1 is supplied to the ignition coil IGC1 through the contacts j and g and the resistor R16.

When the driver wants to open the door in the running condition he rotates the key 21' and the contact b comes into electrical connection with contact a of the control switch S8. At the same time, contact j of the switch S9 also comes into electrical connection with contact e, and B+ of power source 1 is no longer supplied to the ignition coil IGC1, thus stopping the engine. On the other hand, B+ of power source 1 is supplied to the contact A4 through the contact a of the switch S8, thus permitting unlocking of the door.

The following is a description of the operation of the circuitry for preventing a driver from driving when he has consumed too much alcohol and is, therefore, intoxicated, with reference to FIGS. 2 and 10.

The alcohol sensing part ASP is mounted near the driver's seat. When the driver has consumed alcohol, the alcohol sensor AS1 shown in FIG. 10 senses the degree of alcohol present. If that degree exceeds a predetermined value (which value can be adjusted by the variable resistor V11), the voltage comparator VC1 outputs high level signal. This high level signal actuates SCR4 which, in turn, actuates, the relay circuit RY5 thereby closing the contacts H and J (which are connected between two terminals of the ignition coil IGC1). Accordingly, the ignition coil IGC1 becomes short circuited, and the starting of the engine becomes impossible.

When another non-intoxicated driver wants to start the engine again, he may rotate the key 21' and the contact j of the switch S9 comes into electrical connection with the contact e. The SCR4 is then reset, and the contacts H and J are disconnected. Thereafter the driver rotates the key 21' to the contact h position (i.e. "start" position) and the engine is started in the fashion previously discussed.

The key signal and lock signal of the present invention may also, as previously mentioned, be a logic signal or photoelectric signal, in place of the previously discussed frequency signal.

FIG. 11 shows another embodiment of the key and signal comparing circuit, which employs a logic signal key 2' and a logic signal comparing circuit 3'.

When using the embodiment of the present invention that uses a logic signal, the key 2' is comprised of several diodes D11–D14 and switches SW11–SW14 while the signal comparing circuit 3' is comprised of switches SW21–SW24, diodes D21–D24, decoder 22, comparator 8' and decoder 80.

The combination of switches, opened or closed in 2' determines a first logic signal which is applied to the decoder 80 in the signal comparing circuit 3'. The combination of switches (SW21–SW24) of 3' determines a reference logic signal which is transmitted to decoder 22 which, in turn, is transmitted to comparator 8' so that the decoded logic signal transmitted by the decoder 80 and the logic signal transmitted by decoder 22 are compared by the comparator 8'. The output of the comparison of the comparator 8' is used as a control signal. When both signals correspond, unlocking occurs.

As is apparent from the above mentioned description, the present invention can provide a new and improved the lock and key which cannot be unlocked by a resemblant key, which provides superior security than the button memory type locks, and which also can prevent a driver from driving while he is intoxicated.

I claim:

1. An electronic lock and key comprising:
   an electronic key including a key signal generator which generates a predetermined signal when said key is inserted into a keyhole of a key holder disposed within said lock;
   an electronic lock comprising, an unlocking means for unlocking said lock,
   an alarming circuit,
   a power source for supplying power to said lock and said key,
   wherein said alarming circuit becomes actuated when a power voltage which is greater than a predetermined level is applied to said lock,
   a signal comparing circuit, said signal comparing circuit including a comparator and a lock signal generator for generating a reference signal, wherein said comparator compares said predetermined signal generated by said key signal generator and said reference signal generated by said lock signal generator and wherein said comparator outputs a first control signal when said predetermined signal and said reference signal are substantially identical thereby indicating the insertion of an authorized key into said keyhole and a second control signal when said predetermined signal and said reference signal are substantially different thereby indicating the insertion of an unauthorized key into said keyhole,
   a delay/switching circuit having a first delay circuit, a second delay circuit, a first relay circuit, and a second relay circuit, wherein where said comparator outputs said first control signal said first delay circuit, coupled between said lock and said power source, becomes actuated a predetermined length of time after receiving said first control signal, thereby actuating said first relay circuit so that said unlocking means actuates to unlock said lock and wherein when said comparator outputs said second control signal said second delay circuit becomes actuated a predetermined length of time after receiving said second control signal thereby actuating said second relay circuit so that said alarming circuit actuates thereby alerting a listener of the insertion of an unauthorized key into said keyhole,
   and a protecting circuit having a relay circuit which actuates to prevent damage from occuring to said electronic lock when one of a power voltage greater than a predetermined level is applied thereto and a short circuit occurs therein.

2. An electronic lock and key according to claim 1 wherein said key signal generator comprises a frequency generator which produces said predetermined signal at a predetermined frequency and wherein said key has disposed thereon a plurality of conductive elements disposed substantially normal to the longitudinal axis of said key, wherein said plurality of conductive elements supply power from said power source to said key signal generator when said key is inserted into said keyhole.

3. An electronic lock and key according to claim 2, wherein said keyholder has disposed thereon a plurality of electrical contacts which corresponds to said plurality of conductive elements of said key, so that each of said plurality of electrical contacts supply said poewr from said power source to a corresponding conductive element of said plurality of conductive elements when said key is sinerted into said keyhole, wherein each contact of said plurality of electrical contacts comprises a housing having a conductive head for supplying power from said power source to said corresponding conductive element of said plurality of conductive elements, a spring disposed under tension within said housing between one end of said housing and one end of said conductive head so that said conductive head abuts and supplies said power to said corresponding conductive element of said first plurality of conductive elements when said key is inserted into said keyhole.

4. An electronic lock and key according to claim 1, wherein said key has disposed thereon a plurality of conductive elements disposed substantialy parallel to the longitudinal axis of said key so that said conductive elements supply said power from said power source to said key signal generator when said key is inserted into said key hole.

5. An electronic lock and key according to claim 4, wherein said key holder has disposed therein a plurality of electrical contacts which correspond to said plurality of conductive elements so that said plurality of electrical contacts supplies said power from said power source to said conductive elements.

6. An electronic lock and key according to claim 1 wherein said key signal generator further comprises a photo-electric signal generator which transmits said predetermined signal as a photo-electric signal, and wherein said photo-electric signal generator comprises a transistor for amplifying and conducting said photo-electric signal, a light emitting diode for outputting said photo-electric signal, a local power source for supplying power to said photo-electric signal generator, a depressing member and a switch, said switch being closed by said depressing member when said key is inserted into said key hole thereby supplying said power from said local power source to said photo-electric signal generator so that said photo-electric generator generates said photo-electric signal.

7. An electronic lock and key according to claim 6, wherein said key holder has disposed therein a photo-electric receiving means, said photo-electric receiving means having a photo receiving element for receiving and amplifying said photo-electric signal.

8. An electronic lock and key according to claim 7, wherein said key holder is comprised of a housing, said housing having an insulator, a depressing member which is depressed by the insertion of said key into said key holder and a switch which is closed when said depressing member becomes depressed by said insertion of said key, wherein when said switch is closed, said key signal generator generates said photo-electric signal.

9. An electronic lock and key according to claim 1, wherein said key signal generator generates said predetermined signal as a predetermined logic signal, said predetermined logic signal being determined by a predetermined combination of a first plurality of switches and a corresponding first plurality of diodes which are cooperatively employed so that said diodes conduct when a corresponding switch of said first plurality of switches is open, wherein said lock signal generator which generates said reference signal as a reference logic signal, said reference logic signal being determined by a second plurality of switches and a second plurality of diodes cooperatively employed so that said diodes conduct when a corresponding switch of said second plurality of switches is open, wherein said signal comparing circuit is further comprised of a first and a second decoder, wherein said reference logic signal is transmitted to and decoded by said second decoder and wherein said predetermined logic signal is received and decoded by said first decoder whereby said comparator outputs a control signal that initiates the unlocking of said unlocking device when said predetermined logic signal and said reference logic signal are substantially identical.

10. An electronic lock and key for use with vehicles comprising an electronic key which produces a predetermined unlocking signal to unlock said lock when said key is an authorized key and is inserted within said lock, an electronic lock having at least two key holders for receiving said key, an alcohol sensing means, a power source, wherein each of said key holders is coupled to a start switch and a control switch to comprise a start/-switching means, said start/switching means being coupled between said lock and a starting system for said vehicle, said starting system including an ignition coil so that when said lock is unlocked by the insertion of said authorized key, power from said power source is supplied to said starting system thereby initiating operation of said starting system, wherein said alcohol sensing means is coupled between said power source and said ignition coil of said vehicle, so that when said alcohol sensing means receives an input representing intoxication of a driver, said alcohol sensing means prevents said ignition coil from receiving power from said power source, thereby preventing the operation of said starting system and said vehicle when said driver is intoxicated.

11. An electronic lock and key according to claim 10, wherein the alcohol sensing means comprises an alcohol sensor circuit for sensing the intoxication of said driver, wherein said alcohol sensor circuit produces a control signal which corresponds to said driver's degree of intoxication, said alcohol sensing means further comprising a voltage comparator, for comparing said signal with a reference signal so that when said signal is greater than said reference signal said comparator actuates a silicon controlled rectifier and a relay circuit, said relay circuit having electrical contacts which are coupled between two terminals of said ignition coil so that said contacts close when said relay circuit is actuated thereby electrically bypassing said ignition coil when the quantity of alcohol sensed by said alcohol sensor circuit exceeds a predetermined value.

12. An electronic lock and key according to claim 10 wherein said start switch and said control switch are coaxially mounted within each of said key holders, wherein when said authorized key is inserted into one of said key holders, said control switch supplies power from said power source to said start switch, so that said start switch supplies power from said power source to said starting system thereby initiating the operation of said vehicle.

* * * * *